United States Patent
Kasamatu

(10) Patent No.: US 7,542,662 B2
(45) Date of Patent: Jun. 2, 2009

(54) REPRODUCTION SYSTEM

(75) Inventor: Hideki Kasamatu, Osaka (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 878 days.

(21) Appl. No.: 10/924,882

(22) Filed: Aug. 25, 2004

(65) Prior Publication Data

US 2005/0046752 A1    Mar. 3, 2005

(30) Foreign Application Priority Data

Aug. 27, 2003    (JP) .............................. 2003-303328

(51) Int. Cl.
*H04N 5/00* (2006.01)
*H04N 7/00* (2006.01)

(52) U.S. Cl. ...................... 386/125; 386/105
(58) Field of Classification Search ................... 386/46, 386/83, 125, 124, 45, 1, 105, 106
See application file for complete search history.

(56) References Cited

U.S. PATENT DOCUMENTS

| | | | |
|---|---|---|---|
| 7,245,274 B2 * | 7/2007 | Schedivy ........................ 345/7 |
| 2005/0185801 A1 * | 8/2005 | McCarty et al. ............... 381/87 |
| 2007/0108788 A1 * | 5/2007 | Shalam et al. ............ 296/37.15 |
| 2008/0125031 A1 * | 5/2008 | Fadell et al. ............... 455/3.06 |

FOREIGN PATENT DOCUMENTS

| | | |
|---|---|---|
| CN | 1057371 A | 12/1991 |
| CN | 1426227 A | 6/2003 |
| JP | 61-296383 | 12/1986 |
| JP | 03-040675 A | 2/1991 |
| JP | 3-204713 | 9/1991 |
| JP | 06-237403 A | 8/1994 |
| JP | 11-275684 | 10/1999 |
| JP | 2002-354063 A | 12/2002 |
| JP | 2003-179821 A | 6/2003 |

OTHER PUBLICATIONS

Chinese Office Action dated Oct. 13, 2006, issued in corresponding Chinese Patent Application No. 2004100545974.
Japanese Office Action dated Nov. 18, 2008, Application No. 2003-303328.

* cited by examiner

*Primary Examiner*—Robert Chevalier
(74) *Attorney, Agent, or Firm*—Westerman, Hattori, Daniels & Adrian, LLP.

(57) ABSTRACT

The DVD player is directly mounted without a cord in the video/audio input terminal (connector section), for example, which is provided on the rear side of the liquid crystal projector. The liquid crystal projector is so configured that video is projected on the basis of an input video signal and a radio transmission unit which transmits an input audio signal is directly mounted on without a cord. The radio reception unit is mounted on the speaker apparatus and the speaker outputs audio on the basis of a received audio signal.

16 Claims, 3 Drawing Sheets

US 7,542,662 B2

REPRODUCTION SYSTEM

BACKGROUND OF THE INVENTION

FIELD OF THE INVENTION

The present invention relates to a reproduction system that reproduces video and audio.

Conventionally, a liquid crystal projector has been used as a video display apparatus for home theater, and video signals and audio signals have been fed to the liquid crystal projector from reproduction apparatuses including a DVD (digital versatile disc) player.

Furthermore, in recent years, also a wireless system has been proposed in order to get rid of AV cords. In such a wireless system, both a DVD player and a liquid crystal projector are provided with radio sections. As systems which do not comprise such a wireless system, several kinds of systems can be considered, for example, a system in which audio signals and video signals are fed to a liquid crystal projector through an AV cord and audio is outputted from a speaker built in the liquid crystal projector as shown in FIG. 3A, a system in which only a video signal is fed to a liquid crystal projector and an audio signal is transmitted on a radio from a DVD player to an external speaker as shown in FIG. 3B, and a system in which an only video signal is fed to a liquid crystal projector and an audio signal is fed to an external speaker connected by wire with a DVD player as shown in FIG. 3C. Also, a system in which an externally mounted speaker is driven in a home theater mode has been proposed (See JP-A-11-275684).

SUMMARY OF THE INVENTION

However, AV cords are necessary for a reproduction system, unless both audio signals and video signals are transmitted and received on a radio. As a result, the connecting work is onerous and the cords may spoil the appearance of a room.

In view of the foregoing circumstances, the present invention is intended to provide a reproduction system which can feed signals reproduced by a reproduction apparatus to a video display and a speaker apparatus without using cords.

In order to solve the above-mentioned problems, a reproduction system according to the present invention is a reproduction system comprising a reproduction apparatus, video display, and a speaker apparatus characterized in that the reproduction apparatus is mounted in a video/audio input terminal of the video display without using a cord, and the video display displays video on the basis of an input video signal and has a radio transmission section which transmits an input audio signal on a radio, and the speaker apparatus has a radio reception section and outputs audio on the basis of a received audio signal.

In the above-mentioned configuration, a reproduction apparatus is directly mounted in a video/audio input terminal of the video display without using a cord. Therefore, a cord is unnecessary in connecting these apparatuses.

Furthermore, audio signal is fed to the speaker apparatus from the video display through the radio transmission section and radio reception section. As a result, a cord is also unnecessary in connecting these apparatuses.

The reproduction apparatus may be so configured as to be mounted on a video display via an adapter.

The unitized radio transmission section may be removably mounted on the video display.

The unitized radio reception section may be removably mounted on the speaker apparatus.

Also it is possible to adopt the configuration that the radio transmission section and the radio reception section are connected by a wireless network and the video display is provided with a switch for changing audio output channels and an audio signal is fed to a speaker connected by wire or an internal speaker instead of being fed to the radio transmission section when the connection can not be established by the wireless network.

The foregoing and other objects, features, aspects and advantages of the present invention will become more apparent from the following detailed description with the accompanying drawings.

DESCRIPTION OF THE PREFERRED EMBODIMENT

Figure 1A:
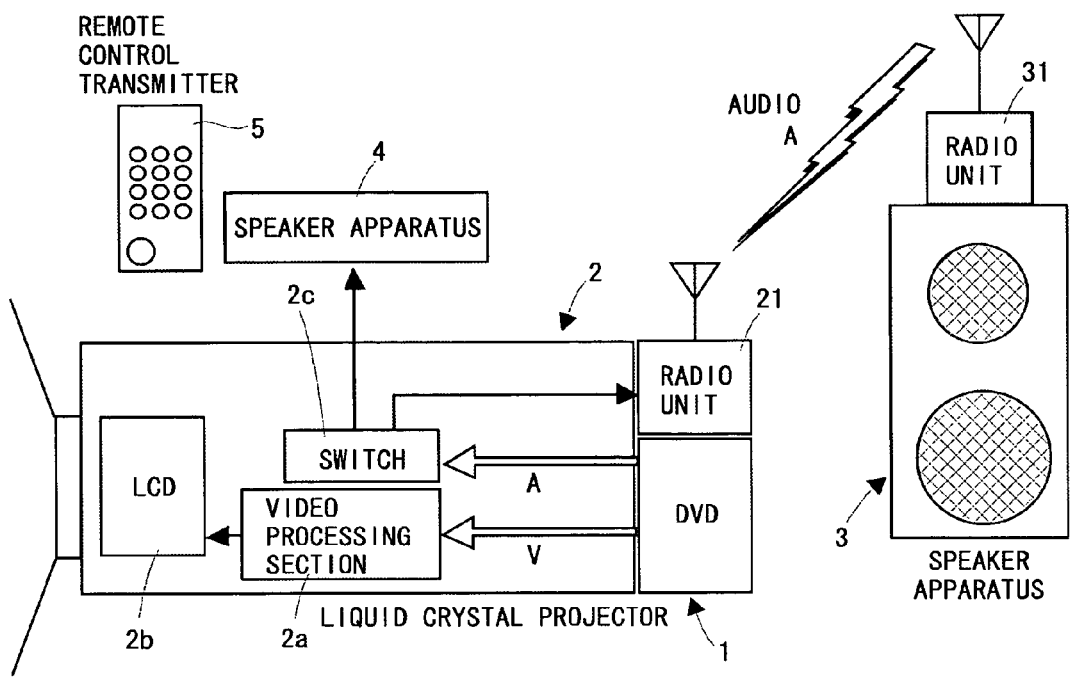
FIG. 1A is an explanatory view showing the schematic configuration of a reproduction system according to an embodiment of the present invention.
Figure 1B:
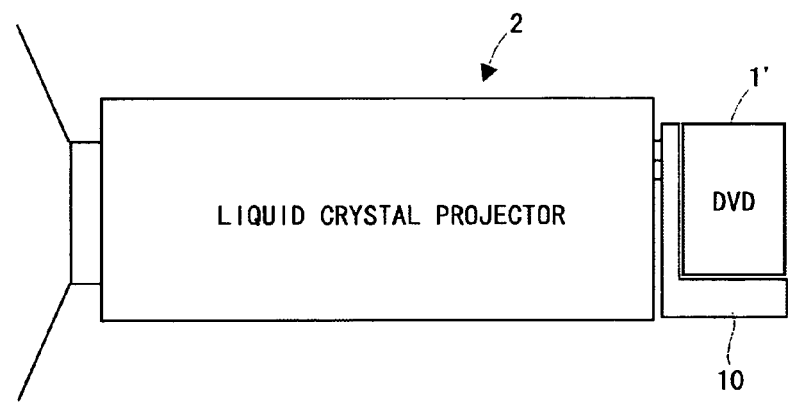
FIG. 1B is an explanatory view showing a reproduction system of a modified example.
Figure 2:
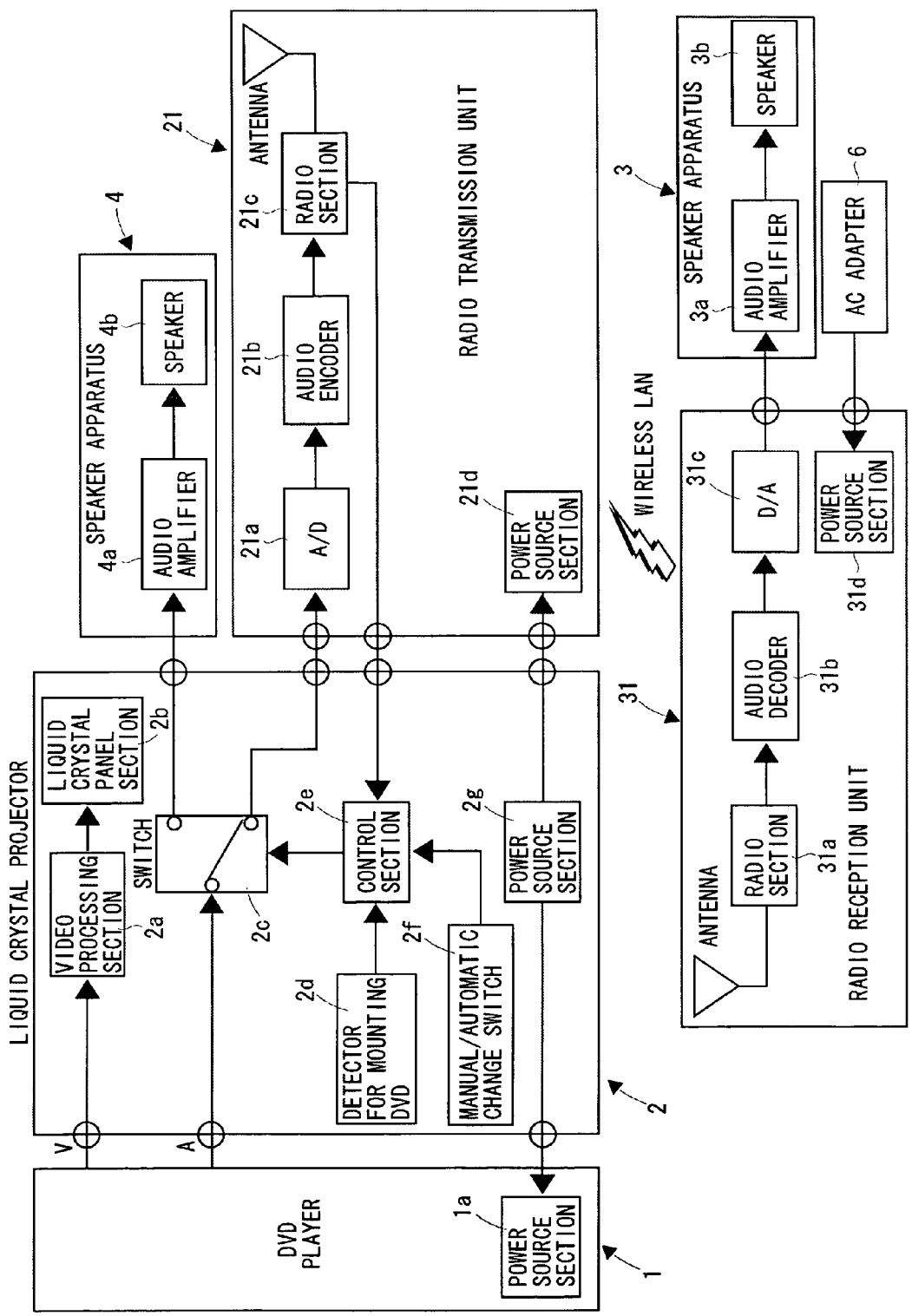
FIG. 2 is a block diagram showing a structure of components included in the reproduction system according to an embodiment of the present invention.
Figure 3A:
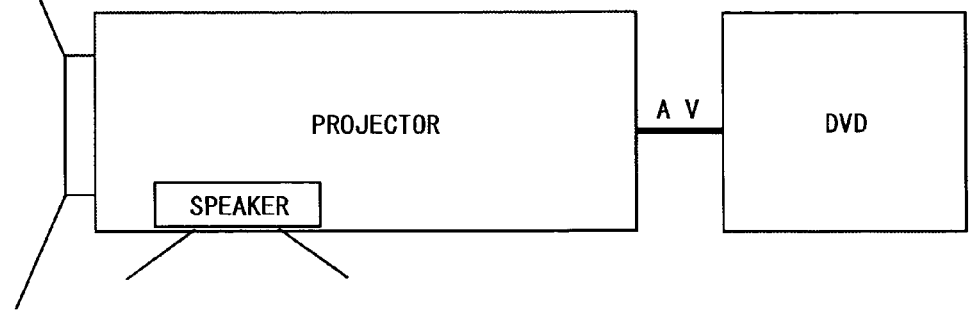
FIG. 3A is an explanatory view showing a structure of a conventional reproduction system.
Figure 3B:
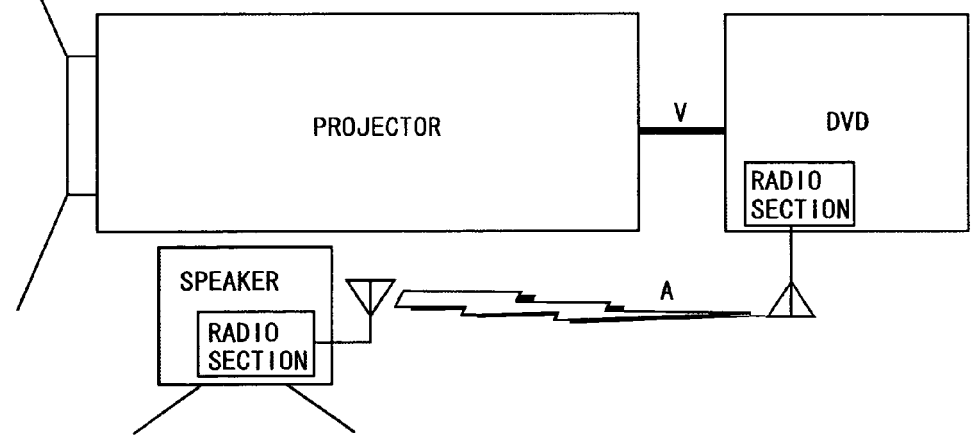
FIG. 3B is an explanatory view showing a structure of a conventional reproduction system.
Figure 3C:
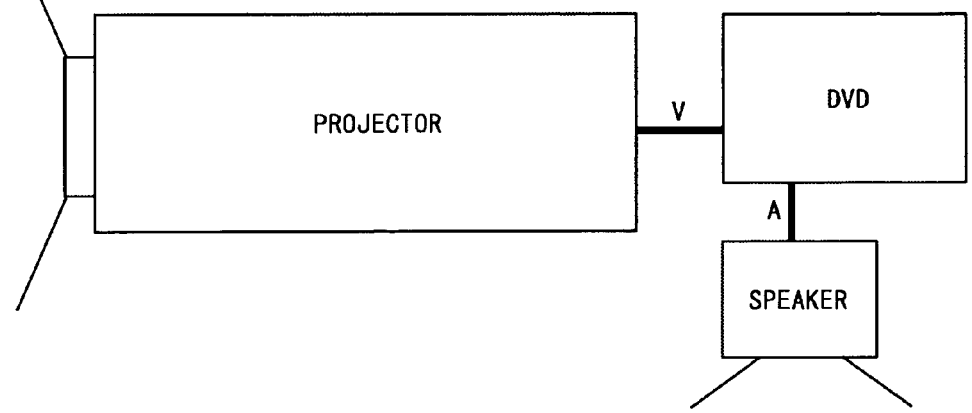
FIG. 3C is an explanatory view showing a structure of a conventional reproduction system.

A reproduction system according to an embodiment of the present invention is now described referring to FIGS. 1A, 1B, and 2.

FIG. 1A is a block diagram showing a reproduction system according to an embodiment of a present invention. The reproduction system comprises a DVD player 1 as a reproduction apparatus, a liquid crystal projector 2 as a projection type video display, and a speaker apparatus 3. The DVD player 1 is so configured as to be connected directly to the liquid crystal projector 2 without a cord. It is connected to a video/audio input terminal (connector section) provided on the rear side of the liquid crystal projector 2, for example. The liquid crystal projector 2 is so configured that video is projected on the basis of an input video signal and a radio transmission unit 21 which transmits an input audio signal is directly mounted on without a cord. The speaker apparatus 3 is so configured that a radio reception unit 31 is directly mounted on without a cord, and the speaker outputs audio on the basis of a received audio signal. The embodiment is now described more specifically.

As shown in FIG. 2, the DVD player 1 has a power source section 1a and a power connector section and is so configured that electric power is supplied from a power source section 2g of the liquid crystal projector 2 to the power source section 1a, with being mounted on the projector. When the play button on the operation panel of the DVD player 1 is pressed, reproduction processing is performed, and coded video/audio obtained by reproduction is decoded and is further converted digital to analog (D/A). A video signal and an audio signal are then produced and they are fed from the video/audio input terminal (connector section) to the liquid crystal projector 2 without a cord. The DVD player 1 has a dedicated structure for the liquid crystal projector 2.

A video processing section 2a of the liquid crystal projector 2 provides various processing including frequency conversion and gamma correction to the video signal fed from the DVD player 1, and produces a drive signal and drives a liquid crystal panel 2b. A switch 2c can change whether an audio signal fed from the DVD player 1 is supplied to an external speaker apparatus 4 connected by wire or the audio signal is supplied to the radio transmission unit 21. A control signal of this change is fed from a control section 2e. The control section 2e controls the switch 2c and allows the audio signal to be fed to the speaker apparatus 4 when it receives a non-mounting signal from a DVD mounting detecting part 2d and allows the audio signal to be fed to the radio transmission unit 21 when it receives a mounting signal from the detecting part 2d. The DVD mounting detecting part 2d detects the mounting of the DVD player 1 (connection by connector) by various kinds of methods. For example, the methods include an electrical detection method of detecting the conductor contact at the time of mounting a DVD player, an optical detection method of detecting the transmission or interception of light at the time of mounting a DVD player, a mechanical detection method of detecting the mechanical press of the switch at the time of mounting a DVD player, and the like (See JP-A-03-204713, JP-A-61-296383). The liquid crystal projector 2 is provided with a manual/automatic change switch 2f connected to the control section 2e. When a user selects automatic mode, output of the DVD mounting detecting part 2d is validated in the control section 2e. On the other hand, when a user selects manual mode, the user can change over the switch 2c by manual operation (by operating the button or switch which are not shown). The manual/automatic change switch 2f may be provided on the body of the liquid crystal projector 2, or it may be provided in a remote control transmitter 5 for the liquid crystal projector.

The speaker apparatus 4 amplifies an audio signal fed from the liquid crystal projector 2 with an audio amplifier 4a and drives a speaker 4b. The speaker apparatus 4 is an accessory for the liquid crystal projector 2, for example, and it is different from a speaker 3 for home theater.

The radio transmission unit 21 has a power source section 21d and a power connector section and is so configured that electric power is supplied from the power source section 2g of the liquid crystal projector 2 to the power source section 21d with being mounted on the liquid crystal projector 2. An analog-to-digital (A/D) conversion circuit 21a of the radio transmission unit 21 digitizes an audio signal fed from the liquid crystal projector 2 and feeds the digitized audio signal to an audio encoder 21b. The audio encoder 21b encodes the digitized audio data received from the conversion circuit 21a and feeds the encoded data to a radio section 21c. The radio section 21c digitally modulates the radio wave of determined frequency on the basis of the encoded audio data received from the encoder to transmit the digitally modulated signal. The radio transmission unit 21 has a dedicated structure for the liquid crystal projector 2.

A radio section 31a of the radio reception unit 31 receives the digitally modulated radio wave and demodulates it to produce encoded audio data, and then feeds the encoded audio data to an audio decoder 31b. The audio decoder 31b decodes the encoded audio data to produce audio data, and then feeds the decoded audio data to a D/A converter 31c. The D/A converter 31c converts the audio data to an analog audio signal and feeds the analog audio signal to the speaker apparatus 3 connected to an audio output terminal. A power source section 31d of the radio reception unit 31 receives power supply from an external AC adapter 6. The radio reception unit 31 has a dedicated structure for the speaker apparatus 3.

The speaker apparatus 3 amplifies an audio signal fed from the radio reception unit 31 with an audio amplifier 3a and drives a speaker 3b. The speaker apparatus 3 is for home theater.

In the above-mentioned configuration, since the DVD player 1 is directly mounted in the video/audio input terminal (connector section) of the liquid crystal projector 2 without a cord, an AV cord is unnecessary in connecting the DVD player and the projector. Also, the audio signal is fed from the liquid crystal projector 2 to the speaker apparatus 3 for home theater through the radio transmission unit 21 and the radio reception unit 31. As a result, the speaker apparatus 3 and the projector 2 can be connected without a cord. That is, audio/video reproduced by the DVD player 1 is fed to the liquid crystal projector 2 without a cord and the video is then displayed with its projection system, while the audio signal is transmitted from the liquid crystal projector 2 to the speaker apparatus 3 for home theater on a radio and outputted as dynamic audio. As for video, it is not transmitted on a radio. Therefore, compared with a configuration of transmitting video on a radio from a DVD player to a liquid crystal projector, it is easier to reduce the cost and to prevent a video signal from being deteriorated in the present configuration.

In the above-mentioned configuration example, the radio reception unit 31 is mounted on the speaker apparatus 3, but it is possible to adopt such a configuration that the radio reception unit 31 is built in the speaker apparatus 3. Also, in the above-mentioned configuration, the radio transmission unit 21 is mounted on the liquid crystal projector 2, but it is possible to adopt such a configuration that the radio transmission unit 21 is built in the liquid crystal projector 2. Moreover, an audio signal can be fed to the external speaker apparatus 4 by the switch 2c in the configuration, but it is possible to adopt such a configuration that the audio signal is fed to an internal speaker apparatus.

The radio transmission unit 21 and the radio reception unit 31 respectively transmits and receives digital audio data, and the method of transmitting data using wireless LAN can be adopted. When the wireless LAN is adopted, the establishment of the connection between the radio transmission unit and a communicating party equipment can be confirmed. Therefore, the control section 2e of the liquid crystal projector 2 can carry out control such as changing over the switch 2c and feeding an audio signal to the radio transmission unit 21 when the above-mentioned connection establishment is confirmed (a signal showing a confirmation of the connection establishment is fed from the radio section 21c to the control section 2e through a connector). Alternatively, a wireless LAN card may be used as the radio transmission unit 21 and the radio reception unit 31.

Furthermore, it is possible to adopt a configuration that the control section 2e and a microcomputer in the DVD player 1 may be connected each other with USB (Universal Serial Bus) or IEEE (The Institute of Electrical and Electronics Engineers, Inc.) 1394, or the like, at the time of mounting the DVD player 1. Also, it is possible to adopt a configuration that function keys such as "play" and "stop" are provided on the remote control transmitter 5 for the liquid crystal projector 2 and a command such as "play" or "stop" is given to the microcomputer in the DVD player 1 through the connector when the control section 2e detected that the key was pressed and the DVD player 1 which received the command can carry out a processing according to the command. That is, the liquid crystal projector 2 can be so configured as to control the mounted DVD player 1. Of course, instead of standardized connection method, a non-standard connection method between computers can be adopted.

As shown in FIG. 1B, it is also possible to adopt a configuration that an adapter 10 is connected with a connector to the rear surface of the liquid crystal projector 2 and a general-purpose DVD player 1' is connected to the adapter 10. For example, the adapter 10 may be prepared specially for each type of DVD players and configured to have a plug section in a position fitted for an AV terminal of a corresponding model of DVD player and a signal cord connected to this plug is connected to the AV terminal of the liquid crystal projector 2. If both the liquid crystal projector 2 and the DVD player are provided with digital data input/output terminals, the adapter 10 can be so configured as to correspond to the digital data input/output terminals.

Though a projection type video display is used as a video display in the above-mentioned configuration, non-projection type video display such as plasma display and liquid crystal display may also be used. Of course, these displays may be provided with devices for receiving digital broadcasting.

As described in the foregoing, according to the present invention, there is an advantage that a signal reproduced by a reproduction apparatus can be fed to a projection type video display and a speaker apparatus without using a cord.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reproduction system, comprising:
    a reproduction apparatus;
    a video display;
    a speaker apparatus,
    wherein the reproduction apparatus is removably mounted in a video/audio input terminal of the video display without using a cord, and the video display displays video on the basis of an input video signal received from the reproduction apparatus and has a radio transmission section which transmits an input audio signal on a radio signal, and the speaker apparatus has a radio reception section and outputs audio on the basis of a received audio signal;
    a mounting detector to detect whether the reproduction apparatus is mounted in the video/audio input terminal of the video display and to output a signal indicating whether the reproduction apparatus is mounted in the video/audio input terminal;
    a switch which switches an audio output channel for the input audio signal between a first audio output channel that supplies the input audio signal to the radio transmission section and a second audio output channel that supplies the input audio signal to a speaker connected to the video display by wire; and
    a control section that receives from the mounting detector the signal indicating whether the reproduction apparatus is mounted in the video/audio input terminal and controls the switch to output the input audio signal to the first audio output channel in response to receiving a signal indicating that reproduction apparatus is mounted in the video/audio input terminal, and controls the switch to output the input audio signal to the second audio output channel in response to receiving a signal indicating that reproduction apparatus is not mounted in the video/audio input terminal.

2. The reproduction system according to claim 1, wherein the reproduction apparatus is mounted on the video display via an adapter.

3. The reproduction system according to claim 1, wherein the radio transmission section is removably mounted on the video display.

4. The reproduction system according to claim 2, wherein the radio transmission section is removably mounted on the video display.

5. The reproduction system according to claim 1, wherein the radio reception section is removably mounted on the speaker apparatus.

6. The reproduction system according to claim 2, wherein the radio reception section is removably mounted on the speaker apparatus.

7. The reproduction system according to claim 3, wherein the radio reception section is removably mounted on the speaker apparatus.

8. The reproduction system according to claim 4, wherein the radio reception section is removably mounted on the speaker apparatus.

9. The reproduction system according to claim 1, wherein the radio transmission section and the radio reception section are connected by a wireless network and
    the video display is provided with a switch which changes audio output channels and an audio signal is fed to a speaker connected by wire or an internal speaker instead of being fed to the radio transmission section when the connection can not be established by the wireless network.

10. The reproduction system according to claim 2, wherein the radio transmission section and the radio reception section are connected by a wireless network and
    the video display is provided with a switch which changes audio output channels and an audio signal is fed to a speaker connected by wire or an internal speaker instead of being fed to the radio transmission section when the connection can not be established by the wireless network.

11. The reproduction system according to claim 3, wherein the radio transmission section and the radio reception section are connected by a wireless network and
    the video display is provided with a switch which changes audio output channels and an audio signal is fed to a speaker connected by wire or an internal speaker instead of being fed to the radio transmission section when the connection can not be established by the wireless network.

12. The reproduction system according to claim 4, wherein the radio transmission section and the radio reception section are connected by a wireless network and
    the video display is provided with a switch which changes audio output channels and an audio signal is fed to a speaker connected by wire or an internal speaker instead of being fed to the radio transmission section when the connection can not be established by the wireless network.

13. The reproduction system according to claim 5, wherein the radio transmission section and the radio reception section are connected by a wireless network and
    the video display is provided with a switch which changes audio output channels and an audio signal is fed to a speaker connected by wire or an internal speaker instead of being fed to the radio transmission section when the connection can not be established by the wireless network.

14. The reproduction system according to claim 6, wherein the radio transmission section and the radio reception section are connected by a wireless network and the video display is provided with a switch which changes audio output channels and an audio signal is fed to a speaker connected by wire or an internal speaker instead of being fed to the radio transmission section when the connection can not be established by the wireless network.

15. The reproduction system according to claim 7, wherein the radio transmission section and the radio reception section are connected by a wireless network and the video display is provided with a switch which changes audio output channels and an audio signal is fed to a speaker connected by wire or an internal speaker instead of being fed to the radio transmission section when the connection can not be established by the wireless network.

16. The reproduction system according to claim 8, wherein the radio transmission section and the radio reception section are connected by a wireless network and the video display is provided with a switch which changes audio output channels and an audio signal is fed to a speaker connected by wire or an internal speaker instead of being fed to the radio transmission section when the connection can not be established by the wireless network.

* * * * *